C. M. SCHAUB.
GLASS SHEARING APPARATUS.
APPLICATION FILED MAY 8, 1914.
1,134,763.
Patented Apr. 6, 1915.
2 SHEETS—SHEET 2.
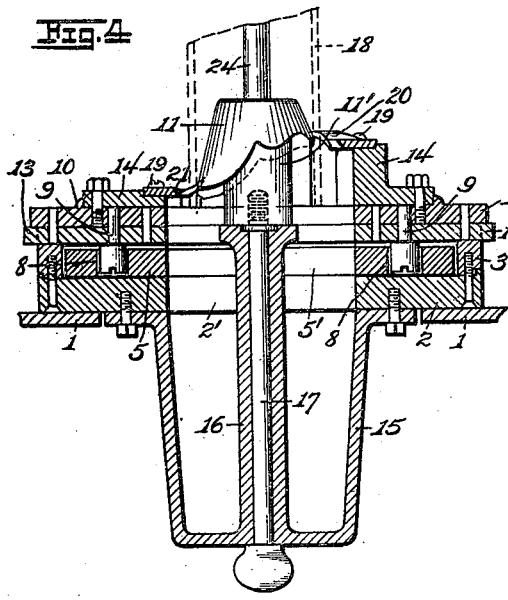
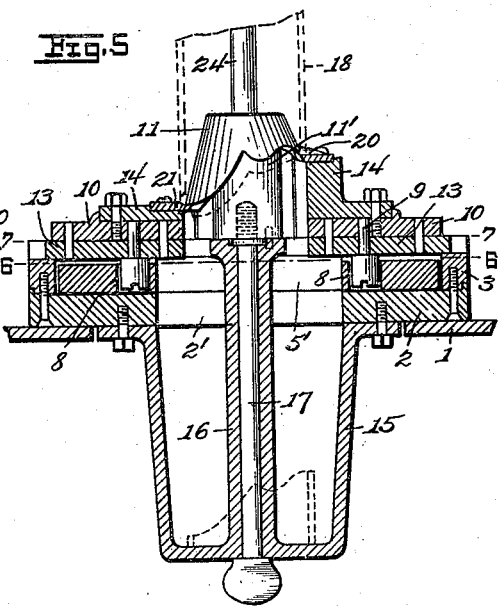
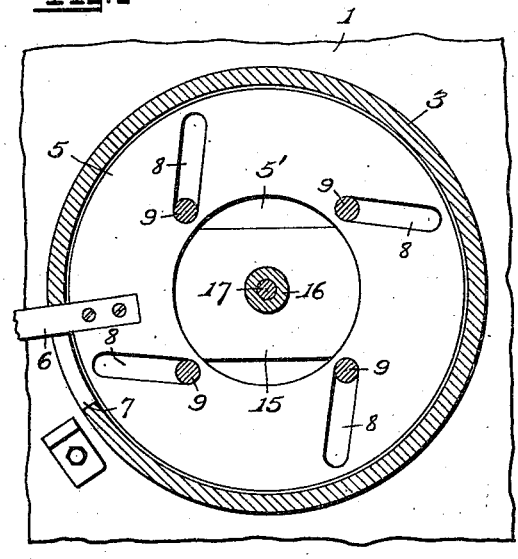
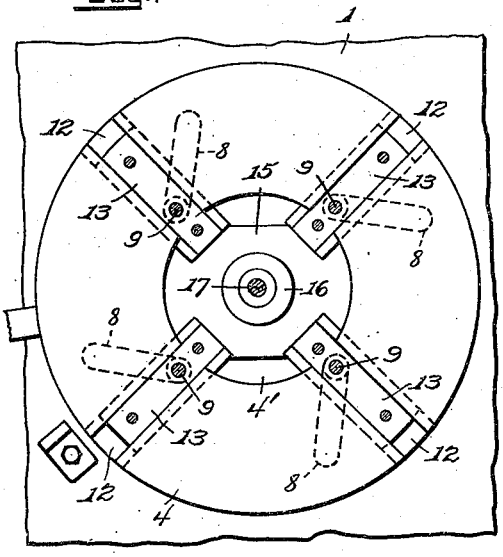
WITNESSES:
INVENTOR
Charles M. Schaub.
BY
ATTORNEY.

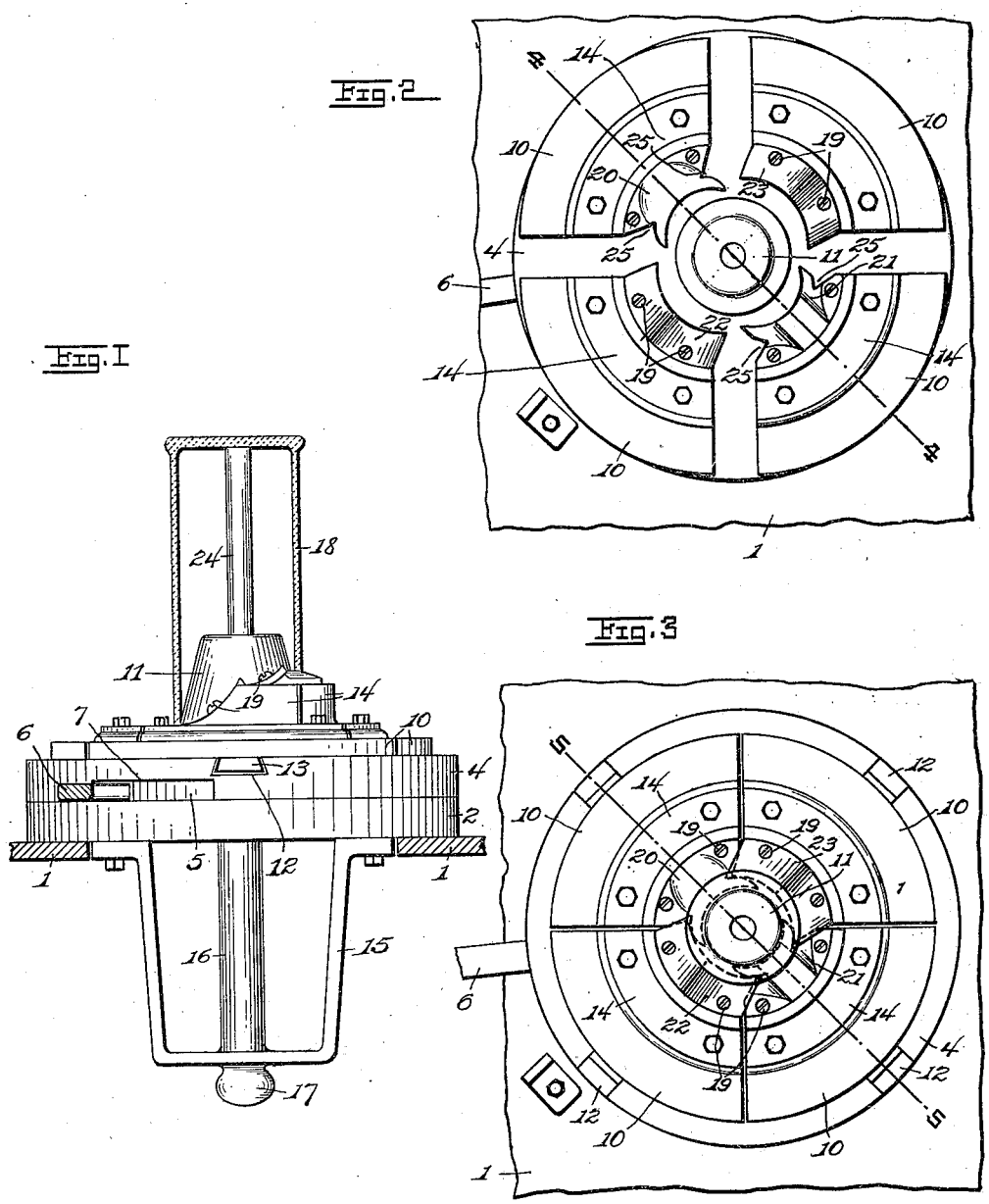

UNITED STATES PATENT OFFICE.

CHARLES M. SCHAUB, OF WHEELING, WEST VIRGINIA, ASSIGNOR TO CENTRAL GLASS WORKS, OF WHEELING, WEST VIRGINIA, A CORPORATION OF WEST VIRGINIA.

GLASS-SHEARING APPARATUS.

1,134,763.　　　　　Specification of Letters Patent.　　Patented Apr. 6, 1915.

Application filed May 8, 1914. Serial No. 837,202.

*To all whom it may concern:*

Be it known that I, CHARLES M. SCHAUB, a citizen of the United States of America, and resident of Wheeling, county of Ohio, and State of West Virginia, have invented certain new and useful Improvements in Glass-Shearing Apparatus, of which the following is a specification.

This invention relates broadly to glass-shearing devices, and it has for its primary object to provide an apparatus for shearing surplus metal from the open ends of hollow articles of blown glassware, as pitchers, cruets and the like, whereby said ends may be made in any desired regular or irregular shape, presenting smooth, clean-cut edges, and whereby uniformity of shape of said ends is insured.

A further object is to provide a shearing apparatus of the character mentioned whereby the shearing may be accomplished without distorting the ware which, at the time of shearing, is necessarily in a plastic state.

With these and other objects in view, the invention resides in the features of construction, arrangement of parts and combinations of elements which will hereinafter be fully described, reference being had to the accompanying drawings, forming a part of this specification, in which—

Figure 1 is a side elevation of the invention; Fig. 2 is a top plan view of the same, showing the jaws open; Fig. 3 is a similar view, showing the jaws closed; Fig. 4 is a section on the line 4—4, Fig. 2; Fig. 5 is a section on the line 5—5, Fig. 3; and—Figs. 6 and 7 are sections taken respectively on the lines 6—6 and 7—7, Fig. 5.

Referring to said drawings, in which like designating characters distinguish like parts throughout the several views—1 indicates a suitable table or supporting stand upon which rest the parts composing my invention, the same comprising a chuck the jaws of which carry knives, and a ware-centering head. Said chuck comprises a horizontal base-plate 2 upon which is mounted the downwardly extending circumferential flange 3 of a stationary plate 4. Said flange loosely embraces a partially-rotatable plate 5 which underlies said plate 4 and has a horizontally disposed handle or lever 6 directed outward therefrom, a slot 7 being provided in said flange for said lever and permitting a limited range of movement of the latter. Provided in said plate 5 are four slots 8 in which are received the heads of vertical guide-pins 9 carried by four segmental jaws 10 which have radial movement with respect to a centrally disposed head 11, the latter being mounted in a manner which will hereinafter be described. Said plate 4 has provided therein four radially disposed dovetail grooves or guideways 12 in which are slidably movable guide bars 13 carried on the under faces of the four jaws 10 and through which said guide pins 9 are extended. Removably mounted in fixed position upon the top of each jaw 10 is a blade-supporting member 14, the elevation and surface configuration of which are determined by the form of blades or knives to be carried thereby and also by the form which the open end of the ware acted upon is to assume.

Attached to the under side of the base-plate 2 are the terminals of a depending yoke-like member 15 which carries thereon or has formed integral therewith a centrally disposed vertical sleeve 16, and projected upwardly through said sleeve is a pin or bolt 17 the upper threaded end of which is designed to receive thereon in stationary position the stem portion 11′ of the head 11 hereinbefore referred to, said head being detachable and being designed to fit more or less closely within and, consequently, to hold in centered position, the articles of blown ware whose open ends it is desired to shape by the shearing action of the knives or blades carried by the supporting members 14. The said head is upwardly tapered and has its under face notched, serrated, or otherwise shaped to correspond to the form which it is desired to produce at the open end of the ware, that herein depicted being designed for use in shearing off the ends of a water pitcher, as 18, to produce a mouth of a more or less common form or shape. Suitably mounted upon said head 11 is a removable post 24 upon which the bottom of the ware is adapted to seat, as shown in Fig. 1, said post serving as a gage by means of which the ware is accurately positioned for the cutting or shearing operation. Interchangeable posts are provided for producing ware of different lengths.

The cutting blades are removably attached, as by means of screws 19, to the supporting members 14 and are so shaped relatively as to coöperate with the under face of the head 11 for accomplishing the desired cut. The inner or cutting edges of said blades are arcuately curved, as shown in Figs. 2 and 3, and two oppositely disposed blades, as 20 and 21, lie with their said edges advanced beyond the edges of the other two blades 22 and 23 so that they will engage and shear through the ware on opposite sides in advance of the engagement of the other blades with said ware. Consequently, at the close of the shearing operation, each of said blades 20 and 21 has its said cutting edge approaching the stem portion 11' of the head more closely than do those of the blades 22 and 23, and, consequently, more closely than is necessary to perform its shearing act. The purpose of this is to enable the subsequently acting blades 22 and 23 to fully complete the shearing not performed by the blades 20 and 21 without leaving small uncut portions at the corners of the blades. This result is further facilitated by the peculiar formation of the blades, which will now be described.

The cutting edge of each of the blades is arc-shaped, that of each of the blades 22 and 23 describing the arc of a greater circle than that described by the edge of each of the blades 20 and 21. Furthermore, each of the four blades has a greater width than is required to constitute it one of four complemental ring sections—that is, its edge describes an arc of more than 90°. To accommodate this extra length of blades, each of the blades 20 and 21 is provided at each end with a substantially V-shaped notch or recess 25, said recess being adapted to receive the adjacent ends of the blades 22 and 23, as is clearly shown in Fig. 3. Thus, when the blades have been carried to the limit of their inward movement, as in shearing, the end of the article of ware will be completely severed.

Provided respectively in the plates 2, 4 and 5 are registering central openings 2', 4' and 5' of greater diameter than the articles of ware which are to be acted upon.

In practice, the chuck is opened to its fullest capacity, as shown in Figs. 2 and 4, by moving the lever 6 back to the limit of its rearward movement. The open end of the previously heated article of ware, as the pitcher 18, is then introduced, as shown in Figs. 1, 4 and 5, the post 24 serving as a seat and as a gage which coöperates with the head 11 for properly positioning the ware with respect to the cutting blades. The lever 6 is then shifted to chuck-closing position, and the blades are thus caused to act upon the ware in the manner hereinbefore described, the severed end of said ware dropping through the openings 4' and 5' to a position on the yoke-like member 15, as shown in dotted lines at the lower end of Fig. 5, whence it may be removed.

The under side of the head 11 and the blades should precisely correspond in form and said head should be adjusted to an elevation which will permit the blades to snugly pass thereunder, as shown in Figs. 3 and 5. As is obvious, the head, the knives and the supporting members 14 are made in interchangeable forms so that any desired conformation of open end of ware may be produced.

What is claimed is—

1. the combination with a chuck having two pairs of movable jaws, of a stationary ware-centering head occupying a central position with respect to said jaws, cutting blades carried by said jaws in oppositely disposed pairs, said blades and the under side of said head being correspondingly shaped and adapted to coöperate for shearing surplus metal from an interposed hollow glass article, the blades of one of said pairs having their edges advanced inward beyond those of the other pair and having their ends recessed to receive the ends of the other pair.

2. The combination with a chuck having two pairs of movable jaws, of a stationary ware-centering head occupying a central position with respect to said jaws, cutting blades having arcuately curved edges carried by said jaws in oppositely disposed pairs, said blades and the under side of said head being correspondingly shaped and adapted to coöperate for shearing surplus metal from an interposed hollow glass article, the blades of one pair having their edges advanced ahead of the edges of the other pair and describing an arc of more than 90°.

3. The combination with a chuck having two pairs of movable jaws, of a stationary ware-centering head occupying a central position with respect to said jaws, cutting blades having arcuately curved edges carried by said jaws in oppositely disposed pairs, said blades and the under side of said head being correspondingly shaped and adapted to coöperate for shearing surplus metal from an interposed hollow glass article, the blades of one pair having their edges advanced ahead of the edges of the other pair and describing an arc of more than 90°, the ends of the blades of said one pair being recessed to receive the ends of the blades of the other pair.

4. The combination with a chuck having two pairs of movable jaws, of a stationary ware-centering head occupying a central position with respect to said jaws, cutting blades having arcuately curved edges carried by said jaws in oppositely disposed pairs, said blades and the under side of said head being correspondingly shaped and adapted to coöperate for shearing surplus metal from an interposed hollow glass article, the blades of one pair having their edges advanced ahead of the edges of the other pair and describing an arc of more than 90°, and means for opening and closing said jaws.

5. The combination with a chuck having two pairs of movable jaws, of a stationary ware-centering head occupying a central position with respect to said jaws, cutting blades having arcuately curved edges carried by said jaws in oppositely disposed pairs, said blades and the under side of said head being correspondingly shaped and adapted to coöperate for shearing surplus metal from an interposed hollow glass article, the blades of one pair having their edges advanced ahead of the edges of the other pair and describing an arc of more than 90°, means for opening and closing said jaws, and means for gaging the article with respect to said blades.

6. The combination with a chuck having two pairs of movable jaws, of a stationary ware-centering head occupying a central position with respect to said jaws, cutting blades carried by said jaws, said blades and the under side of said head being correspondingly shaped and adapted to coöperate for shearing surplus metal from an interposed hollow glass article, said blades having interfitting ends wherein portions of blades seat behind portions of adjacent blades for accomplishing a complete severance of the glass.

In testimony whereof, I affix my signature in presence of two subscribing witnesses.

CHARLES M. SCHAUB.

Witnesses:
W. F. KEEFER,
H. E. DUNLAP.

Copies of this patent may be obtained for five cents each, by addressing the "Commissioner of Patents, Washington, D. C."